(12) United States Patent
Norris

(10) Patent No.: US 8,958,580 B2
(45) Date of Patent: Feb. 17, 2015

(54) PARAMETRIC TRANSDUCERS AND RELATED METHODS

(71) Applicant: Parametric Sound Corporation, Poway, CA (US)

(72) Inventor: Elwood G. Norris, Poway, CA (US)

(73) Assignee: Turtle Beach Corporation, Poway, CA (US)

( * ) Notice: Subject to any disclaimer, the term of this patent is extended or adjusted under 35 U.S.C. 154(b) by 0 days.

(21) Appl. No.: 13/837,237

(22) Filed: Mar. 15, 2013

(65) Prior Publication Data
US 2014/0104988 A1 Apr. 17, 2014

Related U.S. Application Data

(60) Provisional application No. 61/625,801, filed on Apr. 18, 2012.

(51) Int. Cl.
| | |
|---|---|
| *H04R 17/00* | (2006.01) |
| *H04B 11/00* | (2006.01) |
| *H04R 1/02* | (2006.01) |
| *H04R 17/10* | (2006.01) |

(52) U.S. Cl.
CPC ............... *H04B 11/00* (2013.01); *H04R 1/023* (2013.01); *H04R 17/00* (2013.01); *H04R 17/10* (2013.01); *H04R 2217/03* (2013.01)
USPC ............ 381/189; 381/391; 367/172; 367/174

(58) Field of Classification Search
CPC ........ H04B 11/00; H04R 17/10; H04R 17/00; H04R 2217/03; H04R 1/023
USPC ............... 367/172, 174; 381/77, 79, 189, 391
See application file for complete search history.

(56) References Cited

U.S. PATENT DOCUMENTS

| 1,616,639 A | 2/1927 | Sprague |
| 1,764,008 A | 6/1930 | Crozier |
| 1,799,053 A | 3/1931 | Mache |
| 1,809,754 A | 6/1931 | Steedle |

(Continued)

FOREIGN PATENT DOCUMENTS

| JP | H2265400 | 10/1990 |
| WO | WO01/08449 | 2/2001 |

(Continued)

OTHER PUBLICATIONS

U.S. Appl. No. 13/160,048, filed Jun. 14, 2011, Elwood G. Norris; office action dated Oct. 1, 2013.

(Continued)

*Primary Examiner* — Isam Alsomiri
*Assistant Examiner* — Hovhannes Baghdasaryan
(74) *Attorney, Agent, or Firm* — Thorpe North & Western LLP

(57) ABSTRACT

An ultrasonic emitter comprises a support member operable to support an ultrasonic emittive material. The support member includes a plurality of support ribs. The ultrasonic emittive material is coupled to upper portions of the support ribs so as to be carried by the support member. A protective screen has a plurality of apertures formed therein, the protective screen being in contact with the ultrasonic emittive material atop the support ribs such that the spacing between the ultrasonic emittive material and the protective screen is substantially zero atop the support ribs.

18 Claims, 6 Drawing Sheets

(56) References Cited

U.S. PATENT DOCUMENTS

| | | |
|---|---|---|
| 1,951,669 A | 3/1934 | Ramsey |
| 1,983,377 A | 12/1934 | Kellogg |
| 2,461,344 A | 2/1949 | Olson |
| 2,855,467 A | 10/1958 | Curry |
| 2,872,532 A | 2/1959 | Buchmann et al. |
| 2,935,575 A | 5/1960 | Bobb |
| 2,975,243 A | 3/1961 | Katella |
| 2,975,307 A | 3/1961 | Schroeder et al. |
| 3,008,013 A | 11/1961 | Williamson et al. |
| 3,012,222 A | 12/1961 | Hagemann |
| 3,136,867 A | 6/1964 | Brettell |
| 3,345,469 A | 10/1967 | Rod |
| 3,373,251 A | 3/1968 | Seeler |
| 3,389,226 A | 6/1968 | Peabody |
| 3,398,810 A | 8/1968 | Clark, III |
| 3,461,421 A | 8/1969 | Stover |
| 3,544,733 A | 12/1970 | Reylek |
| 3,612,211 A | 10/1971 | Clark, III |
| 3,613,069 A | 10/1971 | Cary, Jr. |
| 3,654,403 A | 4/1972 | Bobb |
| 3,674,946 A | 7/1972 | Winey |
| 3,710,332 A | 1/1973 | Tischner et al. |
| 3,723,957 A | 3/1973 | Damon |
| 3,742,433 A | 6/1973 | Kay et al. |
| 3,787,642 A | 1/1974 | Young, Jr. |
| 3,816,774 A | 6/1974 | Ohnuki et al. |
| 3,821,490 A | 6/1974 | Bobb |
| 3,829,623 A | 8/1974 | Willis et al. |
| 3,833,771 A | 9/1974 | Collinson |
| 3,836,951 A | 9/1974 | Geren et al. |
| 3,892,927 A | 7/1975 | Lindenberg |
| 3,919,499 A | 11/1975 | Winey |
| 3,941,946 A | 3/1976 | Kawakami et al. |
| 3,997,739 A | 12/1976 | Kishikawa et al. |
| 4,056,742 A | 11/1977 | Tibbetts |
| 4,064,375 A | 12/1977 | Russell et al. |
| 4,160,882 A | 7/1979 | Driver |
| 4,207,571 A | 6/1980 | Passey |
| 4,210,786 A | 7/1980 | Winey |
| 4,242,541 A | 12/1980 | Ando |
| 4,245,136 A | 1/1981 | Krauel, Jr. |
| 4,284,921 A | 8/1981 | Lemonon et al. |
| 4,289,936 A | 9/1981 | Civitello |
| 4,295,214 A | 10/1981 | Thompson |
| 4,322,877 A | 4/1982 | Taylor |
| 4,378,596 A | 3/1983 | Clark |
| 4,385,210 A | 5/1983 | Marquiss |
| 4,418,404 A | 11/1983 | Gordon et al. |
| 4,419,545 A | 12/1983 | Kuindersma |
| 4,429,193 A | 1/1984 | Busch-Vishniac et al. |
| 4,439,642 A | 3/1984 | Reynard |
| 4,471,172 A | 9/1984 | Winey |
| 4,480,155 A | 10/1984 | Winey |
| 4,514,773 A | 4/1985 | Susz |
| 4,550,228 A | 10/1985 | Walker et al. |
| 4,558,184 A | 12/1985 | Busch-Vishniac et al. |
| 4,593,160 A | 6/1986 | Nakamura |
| 4,593,567 A | 6/1986 | Isselstein et al. |
| 4,672,591 A | 6/1987 | Breimesser et al. |
| 4,695,986 A | 9/1987 | Hossack |
| 4,751,419 A | 6/1988 | Takahata |
| 4,803,733 A | 2/1989 | Carver et al. |
| 4,823,908 A | 4/1989 | Tanaka et al. |
| 4,837,838 A | 6/1989 | Thigpen et al. |
| 4,872,148 A * | 10/1989 | Kirby et al. ................... 367/172 |
| 4,885,781 A | 12/1989 | Seidel |
| 4,887,246 A | 12/1989 | Hossack et al. |
| 4,888,086 A | 12/1989 | Hossack et al. |
| 4,903,703 A | 2/1990 | Igarashi et al. |
| 4,908,805 A | 3/1990 | Sprenkels et al. |
| 4,939,784 A | 7/1990 | Bruney |
| 4,991,148 A | 2/1991 | Gilchrist |
| 5,018,203 A | 5/1991 | Sawyers et al. |
| 5,054,081 A | 10/1991 | West |
| 5,115,672 A | 5/1992 | McShane et al. |
| 5,142,511 A | 8/1992 | Kanai et al. |
| 5,153,859 A | 10/1992 | Chatigny et al. |
| 5,210,803 A | 5/1993 | Martin et al. |
| 5,287,331 A | 2/1994 | Schindel et al. |
| 5,317,543 A | 5/1994 | Grosch |
| 5,357,578 A | 10/1994 | Taniishi |
| 5,361,381 A | 11/1994 | Short |
| 5,392,358 A | 2/1995 | Driver |
| 5,430,805 A | 7/1995 | Stevenson et al. |
| 5,487,114 A | 1/1996 | Dinh |
| 5,539,705 A | 7/1996 | Akerman et al. |
| 5,638,456 A | 6/1997 | Conley et al. |
| 5,684,884 A | 11/1997 | Nakaya et al. |
| 5,700,359 A | 12/1997 | Bauer |
| 5,859,915 A | 1/1999 | Norris |
| 5,885,129 A | 3/1999 | Norris |
| 5,889,870 A | 3/1999 | Norris |
| 6,011,855 A | 1/2000 | Selfridge et al. |
| 6,041,129 A | 3/2000 | Adelman |
| 6,106,399 A | 8/2000 | Baker et al. |
| 6,108,427 A | 8/2000 | Norris et al. |
| 6,151,398 A | 11/2000 | Norris |
| 6,188,772 B1 | 2/2001 | Norris et al. |
| 6,229,899 B1 | 5/2001 | Norris et al. |
| 6,241,612 B1 | 6/2001 | Heredia |
| 6,304,662 B1 | 10/2001 | Norris et al. |
| 6,411,015 B1 | 6/2002 | Toda |
| 6,498,531 B1 | 12/2002 | Ulrick et al. |
| 6,556,687 B1 | 4/2003 | Manabe |
| 6,584,205 B1 | 6/2003 | Croft, III et al. |
| 6,606,389 B1 | 8/2003 | Selfridge et al. |
| 6,628,791 B1 | 9/2003 | Bank et al. |
| 6,631,196 B1 | 10/2003 | Higgins |
| 6,775,388 B1 * | 8/2004 | Pompei ........................ 381/191 |
| 6,914,991 B1 | 7/2005 | Pompei |
| 6,975,731 B1 | 12/2005 | Cohen et al. |
| 7,162,042 B2 | 1/2007 | Spencer et al. |
| 7,369,665 B1 | 5/2008 | Cheng |
| 7,536,008 B2 | 5/2009 | Howes et al. |
| 7,564,981 B2 | 7/2009 | Croft, III |
| 7,596,229 B2 | 9/2009 | Croft, III |
| 7,657,044 B2 | 2/2010 | Pompei |
| 7,667,444 B2 | 2/2010 | Mevay et al. |
| 7,729,498 B2 | 6/2010 | Spencer et al. |
| 7,850,526 B2 | 12/2010 | Mao |
| 7,957,163 B2 | 6/2011 | Hua |
| 8,027,488 B2 | 9/2011 | Pompei |
| 8,106,712 B2 | 1/2012 | Lee |
| 8,165,328 B2 | 4/2012 | Thomsen |
| 8,391,514 B2 | 3/2013 | Norris |
| 2004/0052387 A1 | 3/2004 | Norris et al. |
| 2005/0008168 A1 | 1/2005 | Pompei |
| 2005/0008268 A1 | 1/2005 | Plourde et al. |
| 2005/0086058 A1 | 4/2005 | Lemelson et al. |
| 2005/0100181 A1 | 5/2005 | Croft, III et al. |
| 2005/0152561 A1 | 7/2005 | Spencer |
| 2005/0195985 A1 | 9/2005 | Croft, III et al. |
| 2005/0220311 A1 | 10/2005 | Sun et al. |
| 2006/0025214 A1 | 2/2006 | Smith |
| 2006/0215841 A1 | 9/2006 | Vieilledent et al. |
| 2007/0154035 A1 | 7/2007 | Fukui |
| 2007/0211574 A1 | 9/2007 | Croft, III |
| 2008/0261693 A1 | 10/2008 | Zalewski |
| 2008/0279410 A1 | 11/2008 | Cheung et al. |
| 2010/0016727 A1 | 1/2010 | Rosenberg |
| 2010/0040249 A1 | 2/2010 | Lenhardt |
| 2010/0041447 A1 | 2/2010 | Graylin |
| 2010/0166222 A1 | 7/2010 | Bongiovi |
| 2010/0302015 A1 | 12/2010 | Kipman et al. |
| 2011/0018710 A1 * | 1/2011 | Booij et al. ............... 340/539.13 |
| 2011/0044467 A1 | 2/2011 | Pompei |
| 2011/0051977 A1 | 3/2011 | Losko et al. |
| 2011/0077080 A1 | 3/2011 | Meer |
| 2011/0103614 A1 | 5/2011 | Cheung et al. |
| 2011/0212777 A1 | 9/2011 | Chen |
| 2011/0216928 A1 | 9/2011 | Eisenberg et al. |
| 2012/0029912 A1 | 2/2012 | Almagro |
| 2012/0051556 A1 | 3/2012 | Pompei |
| 2012/0057734 A1 | 3/2012 | Schulein |

(56) References Cited

U.S. PATENT DOCUMENTS

| | | |
|---|---|---|
| 2012/0148070 A1 | 6/2012 | Norris |
| 2012/0148082 A1 | 6/2012 | Norris |
| 2014/0133668 A1 | 5/2014 | Podoloff |
| 2014/0161282 A1 | 6/2014 | Norris |
| 2014/0161291 A1 | 6/2014 | Matsuzawa |

FOREIGN PATENT DOCUMENTS

| | | |
|---|---|---|
| WO | WO01/15491 | 3/2001 |
| WO | WO01/52437 | 7/2001 |
| WO | WO 2008/46175 A1 | 4/2008 |
| WO | WO 2013/158298 | 10/2013 |

OTHER PUBLICATIONS

U.S. Appl. No. 13/160,051, filed Jun. 14, 2011, Elwood G. Norris; office action dated Oct. 31, 2013.

U.S. Appl. No. 13/761,484, filed Feb. 7, 2013, Elwood G. Norris; office action dated Nov. 4, 2013.

Berktay et al; Possible Exploitation of Non-Linear Acoustics in Underwater Transmitting Applications; Apr. 13, 1965; vol. 4, No. 2, pp. 435-461.

Crandall et al; The Air-Damped Vibrating System: Theoretical Calibration of the Condenser Transmitter; American Physical Society; Dec. 28, 1917; pp. 449-460.

Makarov et al; Parametric Acoustic Nondirectional Radiator; Acustica; 1992; vol. 77, pp. 240-242.

PCT Application PCT/US2013/021064; Filed Jan. 10, 2013; Parametric Sound Corporation; International Search Report Mailed May 16, 2013.

Westervelt; Parametric Acoustic Array; The Journal of the Acoustical Society of America; Apr. 1963; vol. 35, No. 1, pp. 535-537.

U.S. Appl. No. 13/738,887, filed Jan. 10, 2013, Elwood G. Norris.

U.S. Appl. No. 13/863,971, filed Apr. 16, 2013, Elwood G. Norris.

U.S. Appl. No. 13/917,273, filed Jun. 13, 2013, Elwood G. Norris.

U.S. Appl. No. 13/917,315, filed Jun. 13, 2013, Elwood G. Norris.

U.S. Appl. No. 13/935,246, filed Jul. 3, 2013, Elwood G. Norris.

U.S. Appl. No. 13/160,051, filed Jun. 14, 2011; Elwood G. Norris; Office Action issued Jul. 19, 2013.

Wagner; Electrostatic Loudspeaker Design and Construction; Audio Amateur Press Publishers; 1993; Chapters 4-5; pp. 59-91.

Yoneyama et al.; The Audio Spotlight: An Application of Nonlinear Interaction of Sound Waves to a New Type of Loudspeaker Design; Acoustical Society of America; 1983; vol. 73, No. 5; pp. 1532-1536.

Aoki et al; Parametric Loudspeaker-Characteristics of Acoustic Field and Suitable Modulation of Carrier Ultrasound; Electronics and Communications in Japan; Part 3, vol. 74, No. 9, p. 76-82, 1991.

PCT/US13/32214; filed Mar. 15, 2013; Norris.

U.S. Appl. No. 13/761,484, filed Feb. 7, 2013, Norris.

U.S. Appl. No. 13/160,051, filed Jun. 14, 2011, Norris.

PCT Application PCT/US2014/018691; filing date Mar. 26, 2014; Parametric Sound Corporation; International Search report mailed Jun. 6, 2014.

\* cited by examiner

PARAMETRIC TRANSDUCERS AND RELATED METHODS

PRIORITY CLAIM

Priority is claimed to U.S. Provisional Patent Application Ser. No. 61/625,801, filed Apr. 18, 2012, which is hereby incorporated herein by reference in its entirety.

RELATED CASES

This application is related to U.S. patent application Ser. No. 13/160,051, filed Jun. 14, 2011, which claims priority of U.S. Provisional Patent Application Ser. No. 61/354,533, filed Jun. 14, 2010, and which claims priority of U.S. Provisional Patent Application Ser. No. 61/445,195, filed Feb. 22, 2011, all of which are hereby incorporated herein by reference in their entirety.

BACKGROUND OF THE INVENTION

1. Field of the Invention

The present invention relates generally to the field of parametric loudspeakers used to produce useful audible sound.

2. Related Art

Non-linear transduction, such as a parametric array in air, results from the introduction of sufficiently intense, audio modulated ultrasonic signals into an air column. Self demodulation, or down-conversion, occurs along the air column resulting in the production of an audible acoustic signal. This process occurs because of the known physical principle that when two sufficiently intense sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

While the theory of non-linear transduction has been addressed in numerous publications, commercial attempts to capitalize on this intriguing phenomenon have largely failed. Most of the basic concepts integral to such technology, while relatively easy to implement and demonstrate in laboratory conditions, do not lend themselves to applications where relatively high volume outputs are necessary. As the technologies characteristic of the prior art have been applied to commercial or industrial applications requiring high volume levels, distortion of the parametrically produced sound output has resulted in inadequate systems.

Whether the emitter is a piezoelectric crystal or PVDF film or electrostatic emitter, or some other suitable material, in order to achieve volume levels of useful magnitude, conventional systems often required that the emitter be driven at intense levels. These intense levels have often been greater than the physical limitations of the emitter device, resulting in high levels of distortion or high rates of emitter failure, or both, without achieving the magnitude required for many commercial applications.

Efforts to address these problems include such techniques as square rooting the audio signal, utilization of Single Side Band ("SSB") amplitude modulation at low volume levels with a transition to Double Side Band ("DSB") amplitude modulation at higher volumes, recursive error correction techniques, etc. While each of these techniques has proven to have some merit, they have not separately or in combination allowed for the creation of a parametric emitter system with high quality, low distortion and high output volume. The present inventor has found, in fact, that under certain conditions some of the techniques described above may actually cause more measured distortion than does a basic system of like components without the presence of these prior art techniques.

SUMMARY OF THE INVENTION

In accordance with one aspect of the invention, an ultrasonic emitter is provided, including a support member operable to support an ultrasonic emittive material. The support member can include a plurality of support ribs, each support rib being spaced from adjacent support ribs and extending longitudinally along the support member. An ultrasonic emittive material can be coupled to upper portions of the support ribs so as to be carried by the support member. A protective screen can have a plurality of apertures formed therein. The protective screen can be in contact with the ultrasonic emittive material atop the support ribs such that the spacing between the ultrasonic emittive material and the protective screen is substantially zero atop the support ribs.

In accordance with another aspect of the invention, a method of increasing output of an ultrasonic emitter is provided, the emitter including a support member having a plurality of support ribs, each support rib being spaced from adjacent support ribs and extending longitudinally along the support member. The method can include: coupling an ultrasonic emittive material to upper portions of the support ribs such that the support member can carry the emittive material; and positioning a protective screen having a plurality of apertures formed therein atop the support ribs such that the spacing between the ultrasonic emittive material and the protective screen is substantially zero atop the support ribs.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
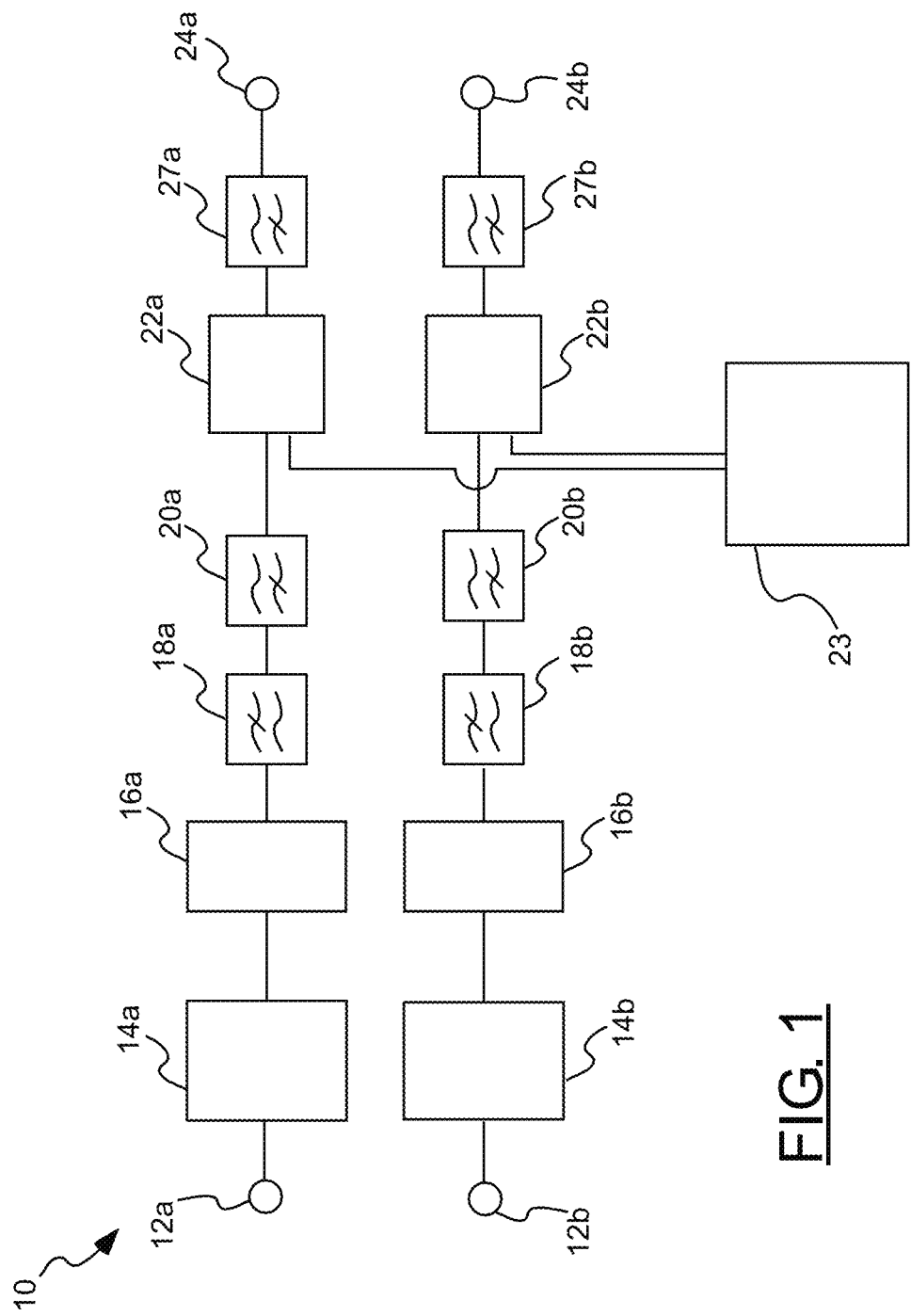
FIG. 1 is a block diagram of an exemplary signal processing system in accordance with one embodiment of the invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

As used herein, the singular forms "a" and "the" can include plural referents unless the context clearly dictates otherwise. Thus, for example, reference to "an emitter" can include one or more of such emitters.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present invention relates to improved ultrasonic emitter configurations for use in a variety of audio applications. More specifically, the emitters disclosed herein have proven exceptionally effective for use in parametric sound systems. The emitters described herein have proven to be much more efficient than conventional emitters (creating greater output with far less power consumption), while also providing sound quality never before achieved with parametric emitter systems.

The ultrasonic emitters discussed herein can be used with a variety of signal processing systems that are typically suitable for use in providing one or more ultrasonic signals to one or more emitters in order to create audible sound by way of emission of ultrasonic waveforms. While any number of signal processing systems can be utilized with the present emitters, an exemplary signal processing system 10 is presented in detail as one example of a suitable signal processing system.

Such an exemplary, non-limiting signal processing system is illustrated schematically in FIG. 1. In this embodiment, various processing circuits or components are illustrated in the order (relative to the processing path of the signal) in which they are arranged according to one implementation of the invention. It is to be understood that the components of the processing circuit can vary, as can the order in which the input signal is processed by each circuit or component. Also, depending upon the embodiment, the processing system 10 can include more or fewer components or circuits than those shown.

Also, the example shown in FIG. 1 is optimized for use in processing multiple input and output channels (e.g., a "stereo" signal), with various components or circuits including substantially matching components for each channel of the signal. It is to be understood that the system can be equally effectively implemented on a single signal channel (e.g., a "mono" signal), in which case a single channel of components or circuits may be used in place of the multiple channels shown.

Referring now to the exemplary embodiment shown in FIG. 1, a multiple channel signal processing system 10 can include audio inputs that can correspond to left 12a and right 12b channels of an audio input signal. Compressor circuits 14a, 14b can compress the dynamic range of the incoming signal, effectively raising the amplitude of certain portions of the incoming signals and lowering the amplitude of certain other portions of the incoming signals resulting in a narrower range of emitted amplitudes. In one aspect, the compressors lessen the peak-to-peak amplitude of the input signals by a ratio of not less than about 2:1. Adjusting the input signals to a narrower range of amplitude is important to minimize distortion which is characteristic of the limited dynamic range of this class of modulation systems.

Figure 2:
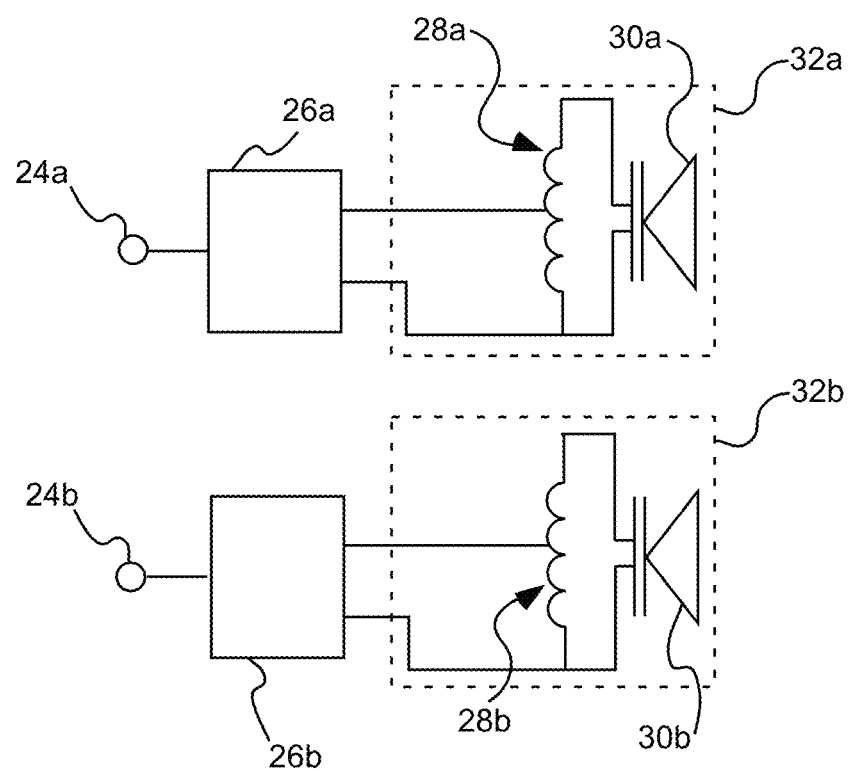
FIG. 2 is a block diagram of an exemplary amplifier and emitter arrangement in accordance with an embodiment of the invention.

After the audio signals are compressed, equalizing networks 16a, 16b can provide equalization of the signal. The equalization networks can advantageously boost lower frequencies to increase the benefit provided naturally by the emitter/inductor combination of the parametric emitter assembly 32a, 32b (FIG. 2).

Low pass filter circuits 18a, 18b can be utilized to provide a hard cutoff of high portions of the signal, with high pass filter circuits 20a, 20b providing a hard cutoff of low portions of the audio signals. In one exemplarily embodiment of the present invention, low pass filters 18a, 18b are used to cut signals higher than 15 kHz, and high pass filters 20a, 20b are used to cut signals lower than 200 Hz (these cutoff points are exemplary and based on a system utilizing an emitter having on the order of 50 square inches of emitter face).

Figure 6:
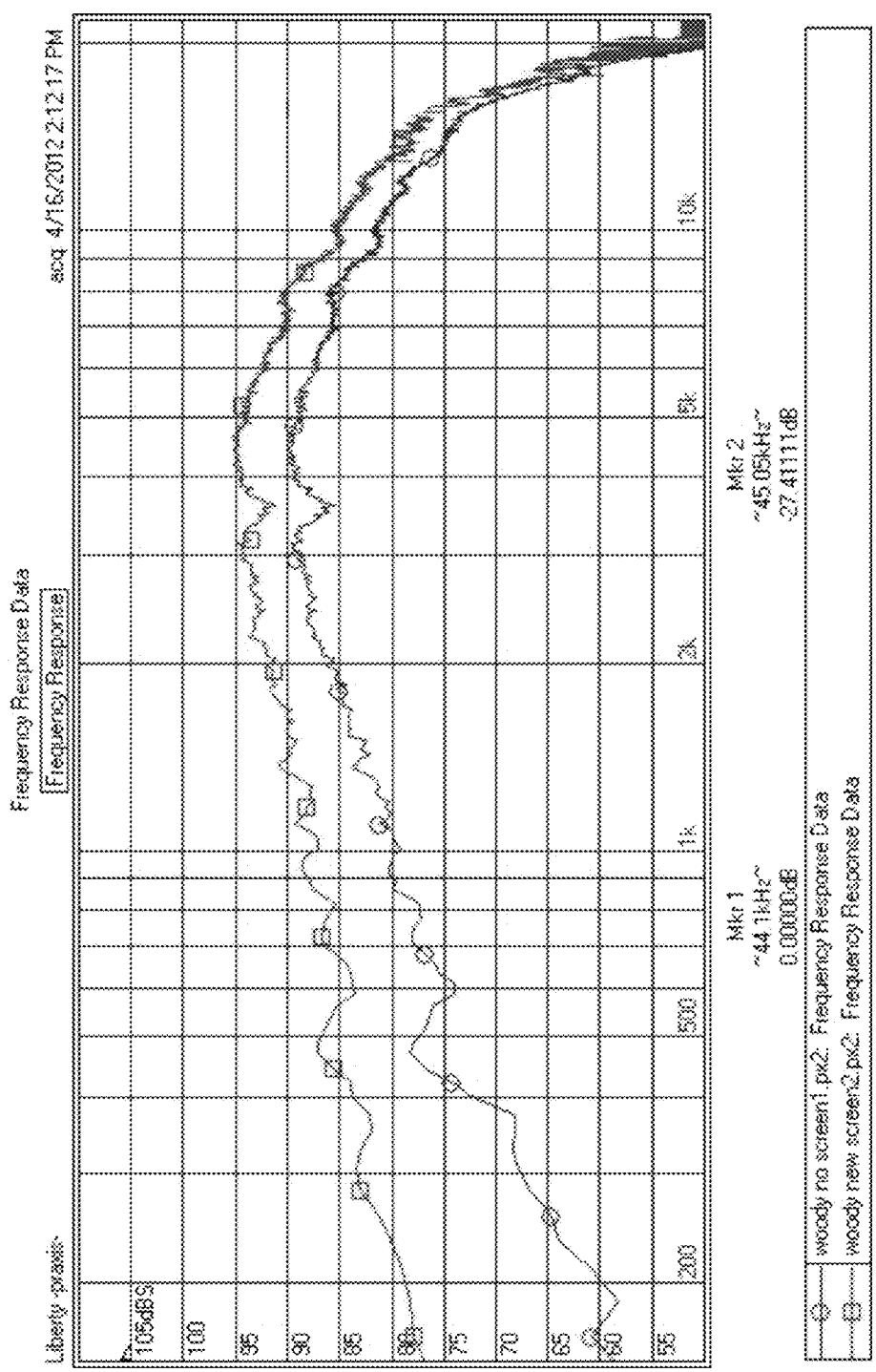
FIG. 6 illustrates two unequalized frequency response curves of signals generated by an ultrasonic emitter in accordance with the present invention; one frequency response curve corresponds to the emitter having no protective screen or cover, and one frequency response curve corresponds to the same emitter having a protective screen or cover strategically positioned adjacent an emittive material.

The high pass filters 20a, 20b can advantageously cut low frequencies that, after modulation, result in nominal deviation of carrier frequency (e.g., those portions of the modulated signal of FIG. 6 that are closest to the carrier frequency). These low frequencies are very difficult for the system to reproduce efficiently (as a result, much energy can be wasted trying to reproduce these frequencies), and attempting to reproduce them can greatly stress the emitter film (as they would otherwise generate the most intense movement of the emitter film).

The low pass filter can advantageously cut higher frequencies that, after modulation, could result in the creation of an audible beat signal with the carrier. By way of example, if a low pass filter cuts frequencies above 15 kHz, with a carrier frequency of around 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is well within the range of human hearing.

In the exemplary embodiment shown, after passing through the low pass and high pass filters, the audio signals are modulated by modulators 22a and 22b, where they are combined with a carrier signal generated by oscillator 23. While not so required, in one aspect of the invention, a single oscillator (which in one embodiment is driven at a selected frequency of 40 kHz to 50 kHz, which range corresponds to readily available crystals that can be used in the oscillator) is used to drive both modulators 22a, 22b. By utilizing a single oscillator for multiple modulators, an identical carrier frequency is provided to multiple channels being output at 24a, 24b from the modulators. This aspect of the invention can negate the generation of any audible beat frequencies that might otherwise appear between the channels while at the same time reducing overall component count.

While not so required, in one aspect of the invention, high-pass filters 27a, 27b can be included after modulation that serve to filter out signals below about 25 kHz. In this manner, the system can ensure that no audible frequencies enter the amplifier via outputs 24a, 24b. In this manner, only the modulated carrier wave is fed to the amplifier(s), with any audio artifacts being removed prior to the signal being fed to the amplifier(s).

Thus, the signal processing system 10 receives audio input at 12a, 12b and processes these signals prior to feeding them to modulators 22a, 22b. An oscillating signal is provided at 23, with the resultant outputs at 24a, 24b then including both a carrier (typically ultrasonic) wave and the audio signals that are being reproduced, typically modulated onto the carrier wave. The resulting signal(s), once emitted in a non-linear medium such as air, produce highly directional parametric sound within the non-linear medium.

For more background on the basic technology behind the creation of an audible wave via the emission of two ultrasonic waves, the reader is directed to numerous patents previously issued to the present inventor, including U.S. Pat. Nos. 5,889,870 and 6,229,899, which are incorporated herein by reference to the extent that they are consistent with the teachings herein. Due to numerous subsequent developments made by the present inventor, these earlier works are to be construed as subordinate to the present disclosure in the case any discrepancies arise therebetween.

The signal processing system can advantageously produce output that can be connected to and used by a variety of emitter types. In one example, an ESMR (electrically sensitive and mechanically responsive) film emitter has been found to be particularly effective. Some exemplary, conventional ESMR film emitters are discussed in U.S. Patent Publication No. 20050100181, which is hereby incorporated herein by reference to the extent it is consistent with the teachings herein (however, the earlier work is to be construed as subordinate to the present disclosure in the case that any discrepancies exist therebetween).

Figure 3:
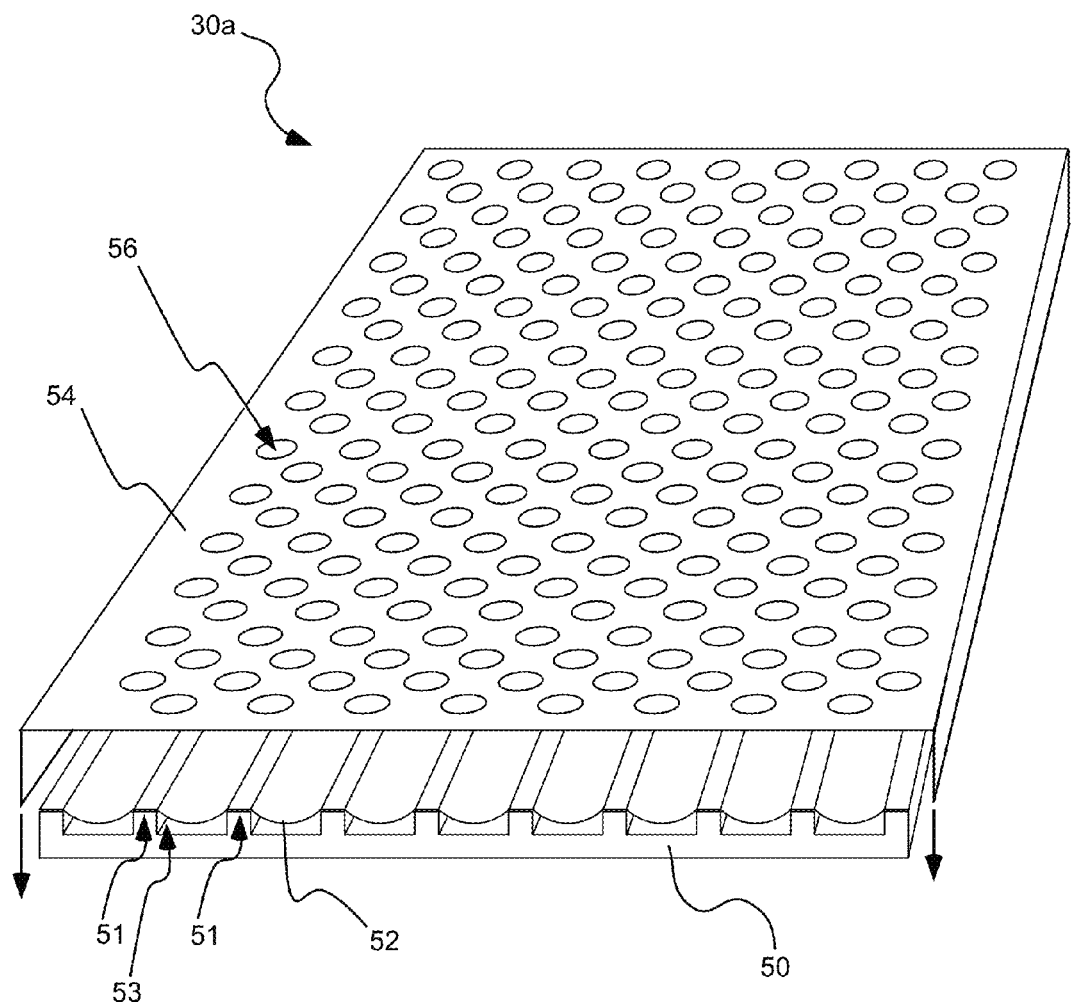
FIG. 3 is a partially exploded view of an exemplary emitter in accordance with an embodiment of the invention.

One specific exemplary emitter provided by the present system is illustrated generally at 30a in FIG. 3. In this aspect of the invention, a support member 50 can include a plurality of support shoulders or ribs 51 which generally extend longitudinally along the support member (although they could also extend laterally across the support member, depending upon the configuration desired). A series of gaps or air spaces 53 are defined between the support ribs. An ultrasound emittive material (such as an ESMR film) 52 can be attached to the support member 50 across upper surfaces of the support ribs. When provided with a signal from the signal processing system 10 (not shown in these figures), the ultrasound emittive material propagates a parametric wave, resulting in the formation of a highly directional sound column (not shown in detail in the drawings).

A protective screen or cover 54 can be positioned over the emittive material 52 to protect the material from inadvertent contact by users as well as dramatically increase output due to strategic positioning of the protective screen relative to the emittive material (as discussed in more detail below). The protective screen or cover 54 can include a series of apertures 56 that allow the parametric wave to pass through the protective screen while increasing the audio output level created by the sound column.

As will be readily appreciated by one of ordinary skill in the art, while protective screens or covers can be desirable (or even required) to protect both users of the product and the emittive film itself, the presence of a protective cover or screen has, in the past, had a negative impact on the output of the emitter unit. Such a result has been expected, as the protective screen typically interferes, in one way or another, with the operation of the emitter as it was designed. However, the present inventor has developed a protective screen system that does not negatively impact output of the emitter unit, and actually increases the output of the emitter without introducing distortion or other negative sound qualities.

In one aspect of the invention, the positioning of the protective screen can be accomplished such that an acoustic impedance matching occurs in the airspace between the protective screen, the airspace and the emittive film. More specifically, it is believed that the protective screen acts as an impedance matching device between the surface of the film and the air. It is believed that this result is achieved due to loading the film face with acoustic energy that is deflected back to the emitter face by the portions of the screen that block acoustic waves rather than allow them to pass through the screen (e.g., the solid portions of the screen that are not apertures). In this manner, the output of the emittive film is better matched to the airspace, leading to a considerable increase in the output of the emitter.

Figure 4:
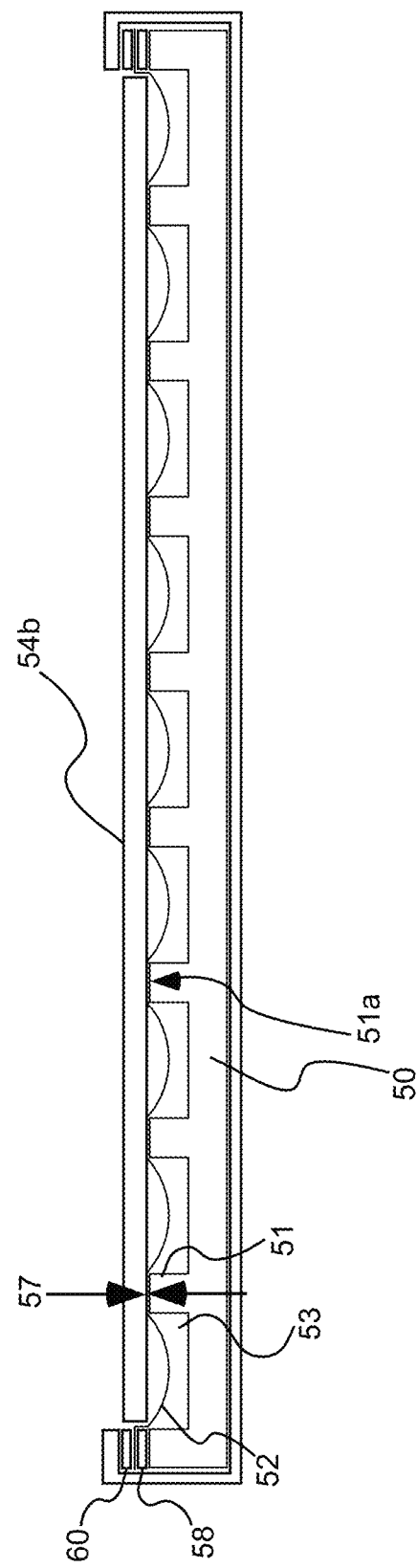
FIG. 4 is a schematic end view of one embodiment of an emitter of the present invention.

FIG. 4 illustrates in greater detail one specific embodiment of the invention. In this embodiment, the emitter can include a support member 50 that is operable to support an ultrasonic emittive material 52 (in this embodiment, an ESMR film). The emittive material is generally supported by upper portions 51a of a plurality of support shoulders or ribs 51. In this example, each support rib is generally spaced from adjacent support ribs and extends longitudinally along the support member (e.g., into the page of FIG. 4). The ultrasonic emittive material can be coupled to upper portions of the support ribs so as to be secured to and carried by the support member. The emittive material is generally free to move in the airspaces 53 defined between the support ribs 51; however, it is generally securely attached to the support ribs atop each rib. In the airspaces, the emittive material is shown arched downwardly, in a concave orientation; however the emittive material will move upwardly and downwardly during operation of the emitter.

A protective screen 54b can include a plurality of apertures formed therein (not shown in this figure). In one aspect of the invention, the protective screen can be in contact with the ultrasonic emittive material atop the support ribs such that the spacing between the ultrasonic emittive material and the protective screen is substantially zero atop the support ribs (e.g., the spacing between the arrows shown at 57 is substantially zero). In one embodiment, the protective screen contacts the emittive material 52 along substantially all of the upper portions of each of the support ribs 51. The present inventor has found that such a placement of the protective screen dramatically increases the output of the emitter, without any increase in the power consumed by the emitter. At some output frequencies, this increase in output has been measured to be between 5 and 10 dB (see, e.g., FIG. 6).

While in some embodiments of the invention the protective screen can simply be positioned atop the upper portions of the protective ribs 51, in other embodiments, the protective screen can be held in position via mechanical force, or chemical bonding. One example by which mechanical clamping can be used to hold the protective screen in place is shown in, and discussed in connection with, FIGS. 5A and 5B. In one aspect of the invention, however, the protective screen is bonded to the upper portions of the support ribs using a suitable adhesive.

In the embodiment shown in FIG. 4, for example, the emittive material or film 52 can be bonded to the upper portions of the support ribs via a suitable adhesive (e.g., a UV-cured adhesive). Once the emittive material is attached to the support frame in this manner, an adhesive (for example, 3M Super 77 adhesive) can be lightly applied to the underside (relative to the arrangement of FIG. 4) of the protective screen prior to positioning the screen over the emittive film. The protective screen or cover can then be positioned atop the support ribs and the spray-on adhesive can be allowed to cure. In this manner, the protective screen can be adhered to substantially all of the emittive film that is exposed across the upper portions of the support ribs. Note that it is not desirable to apply adhesive to, or to attempt to attach the protective screen to, the operable portions of the emittive film (e.g., the portions of the emittive film that lie in the airspaces 53).

In some embodiments of the invention, it may be sufficient to bond only portions of the protective screen to portions of the support ribs. That is, the protective screen may, for example, need not be attached along the entire upper portion of the rib, but only "tacked" every inch or so.

In other embodiments of the invention, the protective screen need not be bonded at all to the upper portions of the support ribs. For example, in the embodiment shown in FIGS. 5A and 5B, a mechanically biased (and at least partially elastic) protective screen 54c can be utilized that initially is formed in the shape shown in FIG. 5A. When this screen is forced into a generally flat configuration, it will tend to flex to return to its original configuration. Thus, in the event the protective screen 54c is forced into flat contact across the upper portions of all of the support ribs of FIG. 5A, then clamped into position with the bar clamps 70 (or some such similar structure) shown in FIG. 5B, the protective screen can be held in position without the use of adhesive.

Figure 5A:
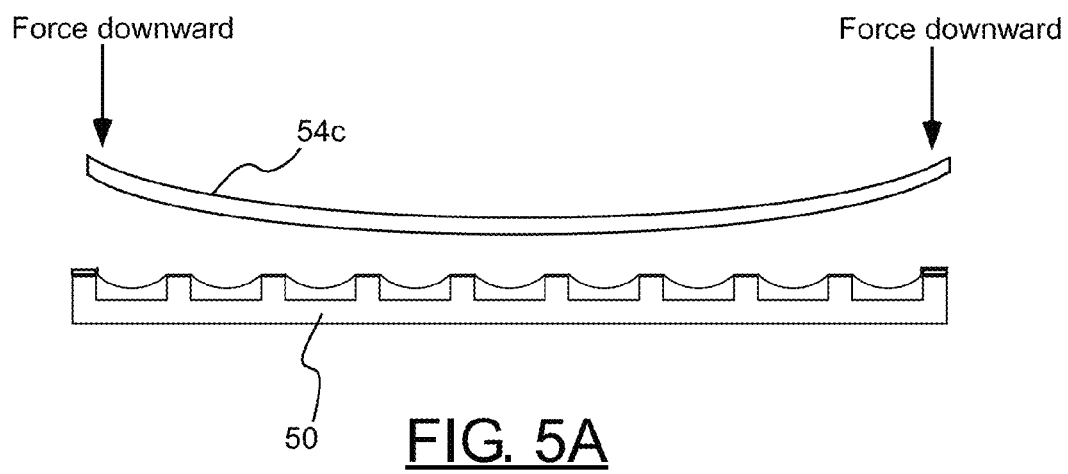
FIG. 5A is a partially exploded view of one embodiment of an emitter of the present invention, shown prior to clamping of the protective screen over the emittive material.
Figure 5B:
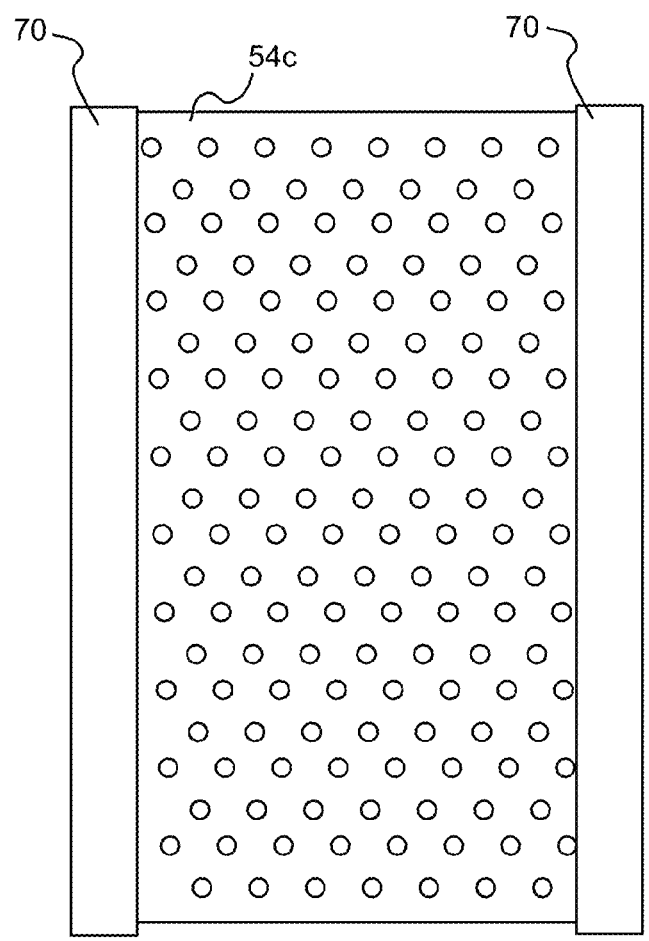
FIG. 5B is a top view of the exemplary emitter of FIG. 5A, shown with clamping structure retaining the protective screen in place over the emittive material.

A similar result can be achieved by using a sufficiently rigid protective screen without having to deform the screen. The example shown in FIGS. 5A and 5B is only one of a variety of manners of accomplishing secure attachment of the protective screen: the screen can be mechanically biased along the lateral axis, or along both lateral and longitudinal axes. Similarly, the bars or clamps can be positioned at ends of the screen, a bottom and/or top of the screen, or along all edges of the screen.

In one aspect of the invention, the upper portions of the support ribs collectively define a support matrix that has a relative degree of flatness (e.g., if a plane were defined across the top portions of the support ribs, this plane would have a degree of flatness associated with it). A bottom plane of the protective screen that is in contact with the upper portions of the support ribs can also have a relative degree of flatness. Ideally, the flatness of the bottom plane of the screen and the upper portions of the ribs that define the support matrix can be substantially the same.

One advantage to clamping or adhering, or otherwise forcing contact between the protective screen and the upper portions of the support ribs is that it may be difficult to a obtain a support member and/or a protective screen that are sufficiently flat to perform consistently. In this case, clamping or adhering the protective screen to the upper portions of the support ribs can force one or both to match the same profile: the resulting relative flatness of the two can thus be made the same. Thus, even in the case where one or both of the protective screen and the support member are slightly warped, the attachment can mechanically force the parts into alignment.

The support frame 50 and protective screen 54 can be formed from a variety of materials. However, in one aspect of the invention, each of these is formed from a polymeric material. Such materials can be relatively easily produced with consistent flatness, and, when a desired level of flatness cannot be achieved, such materials can be more easily forced into flat contact with a counterpart material by the use of clamping, adhesive, etc. Also, most polymeric materials will not include electrically conductive materials, and so will limit the risk of conducting electricity to unwanted areas in the case of an inadvertent electrical short.

In addition to the structure outlined above, the present invention also provides a method of increasing output of an ultrasonic emitter, the emitter including a support member having a plurality of support ribs, each support rib being spaced from adjacent support ribs and extending longitudinally along the support member, the method including: coupling an ultrasonic emittive material to upper portions of the support ribs such that the support member can carry the emittive material; and positioning a protective screen having a plurality of apertures formed therein atop the support ribs such that the spacing between the ultrasonic emittive material and the protective screen is substantially zero atop the support ribs.

While not described in great detail herein, it has also been found that varying the diameter of the apertures 56 can also positively affect the output of the emitter. In one example, forming the apertures with a diameter of about one-half of a wavelength of the resonant frequency is optimal. Apertures having diameters of other fractional measures of the wavelength of the resonant frequency can also be utilized. Also, while the apertures shown in FIGS. 3 and 5B are generally circular, they can be formed in more slot-like (e.g., oval) configurations if so desired. Also, the apertures can vary from the example shown in relative spacing one from another: they can be spaced further or closer to one another than is illustrated in the example figure.

In addition, it has been found that varying the alignment of the apertures 56 relative to axial centers of the airspaces 53 can positively affect the output of the emitter.

FIG. 6 illustrates the positive change in output of an emitter that can be accomplished by strategically positioning the protective screen adjacent the emittive material, as discussed above. The data in the trace identified with a circle illustrates an emitter output without the use of a protective screen or cover. The data in the trace identified with a square illustrates the same emitter (and signal processing system) as that used in the circle trace, only with a protective screen placed directly atop the upper portions of the support ribs (as shown in FIG. 4). As will be appreciated, the emitter performed much better with the protective screen placed as described, across nearly all measured frequencies.

The system described above can provide numerous advantages over conventional systems. Due to the increase in sound output, and the ability to precisely process stereo inputs, two emitters can be used together to produce multidimensional sound quality without requiring the use of headphones or multiple speakers (as all conventional systems do).

The power requirements for the present system are drastically reduced from those of prior art systems. The present signal processing system can be driven by a simple low voltage power supply and consumes as little as 15 watts per channel at peak usage, using an emitter of approximately 55 square inches of surface area. Conventional systems often consume 130 watts at peak usage, and can range from 80-130 watts during continual use. Despite this reduced power requirement, the present system has been measured to output several times the volume of conventional systems.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. An ultrasonic emitter, comprising:
   a support member operable to support an ultrasonic emittive material, the support member including a plurality of support ribs;
   an ultrasonic emittive material coupled to upper portions of the support ribs so as to be carried by the support member, the ultrasonic emittive material being free to move in airspaces defined between the support ribs; and
   a protective screen having a plurality of apertures formed therein and has a flat bottom surface through which the plurality of apertures extend, the protective screen being in direct contact with the ultrasonic emittive material atop the support ribs such that the spacing between the ultrasonic emittive material and the flat bottom surface of the protective screen is substantially zero atop the support ribs;
   the protective screen being unattached to the ultrasonic emittive material between each of the plurality of support ribs such that the ultrasonic emittive material is free to move in airspaces defined between each of the plurality of support ribs.

2. The emitter of claim 1, wherein each support rib is spaced from adjacent support ribs and extends longitudinally along the support member.

3. The emitter of claim 1, wherein the upper portions of the support ribs collectively define a support matrix having a relative degree of flatness, and wherein a bottom plane of the protective screen in contact with the upper portions of the support ribs has a relative degree of flatness that is the same as or more flat than the support matrix.

4. The emitter of claim 1, wherein the protective screen is bonded to the ultrasonic emittive material atop the support ribs.

5. The emitter of claim 1, wherein the protective screen is mechanically held in contact with the ultrasonic emittive material atop the supports.

6. The emitter of claim 1, wherein at least some of the apertures of the protective screen include a diameter of a fractional wavelength of a resonant frequency of the emitter.

7. The emitter of claim 1, wherein the protective screen is formed from an electrically non-conductive material.

8. The emitter of claim 1, wherein a flatness of a bottom plane of the protective screen is substantially matched to a flatness of a support matrix collectively defined by upper portions of the support ribs as a result of coupling the upper portions of the support ribs to the bottom plane of the protective screen.

9. The emitter of claim 1, wherein the apertures extend through the bottom surface of the protective screen substantially perpendicularly to the bottom surface of the protective screen.

10. A method of increasing output of an ultrasonic emitter, the emitter including a support member having a plurality of support ribs with an ultrasonic emittive material coupled to upper portions of each of the plurality of support ribs such that the support member carries the ultrasonic emittive material, the ultrasonic emittive material being free to move in airspaces defined between each of the plurality of support ribs; the method including:
   positioning a protective screen atop the support ribs, the protective screen having a plurality of apertures formed therein and has a flat bottom surface through which the plurality of apertures extend, the spacing between the ultrasonic emittive material and the flat bottom surface of the protective screen being substantially zero atop the support ribs, the protective screen being unattached to the ultrasonic emittive material between each of the plurality of support ribs such that the ultrasonic emittive material is free to move in airspaces defined between each of the plurality of support ribs; and
   fixing a position of the protective screen atop the support ribs to limit or prevent the protective screen from moving during operation of the emitter.

11. The method of claim 10, wherein each support rib is spaced from adjacent support ribs and extends longitudinally along the support member.

12. The method of claim 10, wherein the upper portions of the support ribs collectively define a support matrix having a relative degree of flatness, and wherein a bottom plane of the protective screen in contact with the upper portions of the support ribs has a relative degree of flatness that is the same as or more flat than the support matrix.

13. The method of claim 10, wherein fixing the protective screen atop the support ribs includes bonding the protective screen atop the emittive material atop the support ribs.

14. The method of claim 10, wherein fixing the protective screen atop the support ribs includes mechanically fixing the protective screen atop the emittive material atop the supports.

15. The method of claim 10, wherein at least some of the apertures of the protective screen include a diameter of a fractional wavelength of a resonant frequency of the emitter.

16. The method of claim 10, wherein the protective screen is formed from an electrically non-conductive material.

17. The method of claim 10, wherein a flatness of a bottom plane of the protective screen is substantially matched to a flatness of a support matrix collectively defined by upper portions of the support ribs by coupling the upper portions of the support ribs to the bottom plane of the protective screen.

18. The method of claim 10, wherein the apertures extend through the bottom surface of the protective screen substantially perpendicularly to the bottom surface of the protective screen.

* * * * *